United States Patent
Milde et al.

(10) Patent No.: US 10,317,665 B2
(45) Date of Patent: Jun. 11, 2019

(54) METHOD FOR CORRECTING ILLUMINATION-DEPENDENT ABERRATIONS IN A MODULAR DIGITAL MICROSCOPE, DIGITAL MICROSCOPE AND DATA-PROCESSING PROGRAM

(71) Applicant: Carl Zeiss Microscopy GmbH, Jena (DE)

(72) Inventors: Thomas Milde, Nausnitz (DE); Max Funck, Potsdam (DE)

(73) Assignee: Carl Zeiss Microscopy GMBH, Jena (DE)

( * ) Notice: Subject to any disclaimer, the term of this patent is extended or adjusted under 35 U.S.C. 154(b) by 158 days.

(21) Appl. No.: 15/325,833

(22) PCT Filed: Jul. 13, 2015

(86) PCT No.: PCT/EP2015/065945
§ 371 (c)(1),
(2) Date: Jan. 12, 2017

(87) PCT Pub. No.: WO2016/015984
PCT Pub. Date: Feb. 4, 2016

(65) Prior Publication Data
US 2017/0176734 A1    Jun. 22, 2017

(30) Foreign Application Priority Data
Jul. 31, 2014    (DE) .................. 10 2014 215 095

(51) Int. Cl.
*G02B 7/04* (2006.01)
*G02B 7/10* (2006.01)
(Continued)

(52) U.S. Cl.
CPC ............. *G02B 21/365* (2013.01); *G02B 7/04* (2013.01); *G02B 7/10* (2013.01); *G02B 21/025* (2013.01);
(Continued)

(58) Field of Classification Search
CPC .. G06T 5/007; G06T 5/50; G06T 7/80; G02B 7/04; G02B 7/10; G02B 21/025; G02B 21/365
(Continued)

(56) References Cited

U.S. PATENT DOCUMENTS

2001/0028391 A1* 10/2001 Iko ....................... G02B 21/365
                                                                                          348/110
2004/0184678 A1*  9/2004 Maddison ............ G02B 21/002
                                                                                          382/291
(Continued)

FOREIGN PATENT DOCUMENTS

DE    10114757    10/2001

OTHER PUBLICATIONS

Written Opinion for PCT/EP2015/065945 dated Oct. 9, 2015.
International Search Report for PCT/EP2015/065945 dated Oct. 9, 2015.

*Primary Examiner* — Thai Q Tran
*Assistant Examiner* — Syed Y Hasan
(74) *Attorney, Agent, or Firm* — Nixon Peabody LLP; Jeffrey L. Costellia

(57) ABSTRACT

The invention relates to a method of correcting illumination-dependent aberrations in a modular digital microscope comprising a coaxial bright field illumination apparatus, a motor-driven zoom apparatus, an objective, a digital image acquisition unit and an image processing unit. The method according to the invention is based on the use of calibration data, which are preferably stored in the image processing (Continued)

Figure 1:
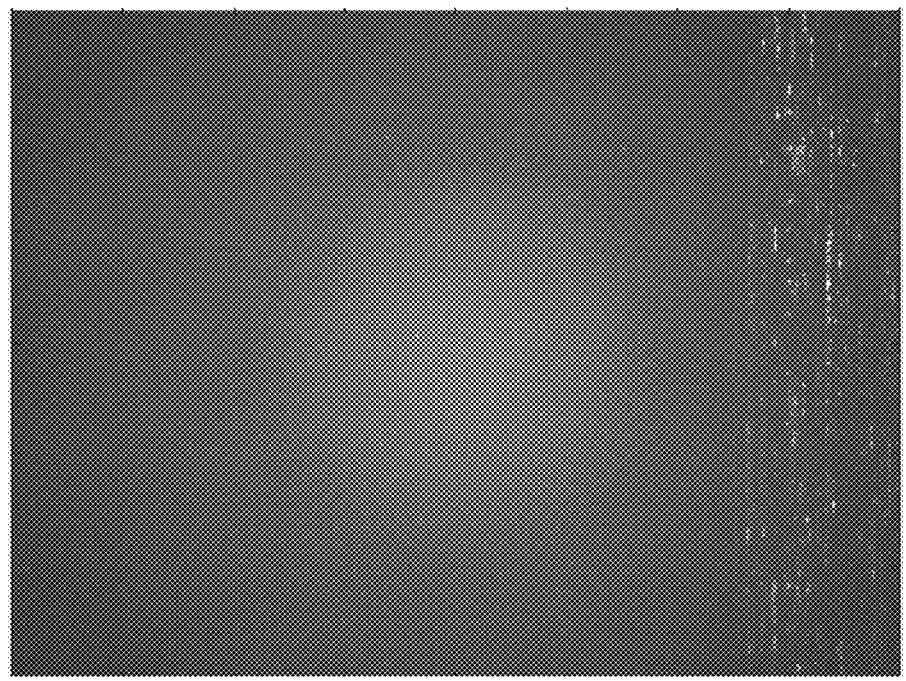

unit as a calibration data record. The calibration data record is established for each combination of objective and zoom and stored in a data memory. The method is integrated into the image processing unit for live-correction or available as software for image post-processing of microscope images. The invention further relates to a digital microscope.

10 Claims, 2 Drawing Sheets

(51) Int. Cl.
  *G02B 21/02* (2006.01)
  *G02B 21/36* (2006.01)
  *G06T 5/00* (2006.01)
  *G06T 5/50* (2006.01)
  *G06T 7/80* (2017.01)

(52) U.S. Cl.
  CPC .............. *G06T 5/007* (2013.01); *G06T 5/50* (2013.01); *G06T 7/80* (2017.01); *G03B 2205/0046* (2013.01); *G06T 2207/10056* (2013.01); *G06T 2207/20208* (2013.01)

(58) Field of Classification Search
  USPC .................... 382/274, 291; 348/240.1, 240.3
  See application file for complete search history.

(56) References Cited

U.S. PATENT DOCUMENTS

| | | | |
|---|---|---|---|
| 2010/0246994 A1* | 9/2010 | Sawada | H04N 5/3572 382/275 |
| 2011/0142365 A1* | 6/2011 | Sakagami | G02B 21/365 382/274 |
| 2012/0044387 A1* | 2/2012 | Usami | H04N 5/3572 348/240.3 |

* cited by examiner

METHOD FOR CORRECTING ILLUMINATION-DEPENDENT ABERRATIONS IN A MODULAR DIGITAL MICROSCOPE, DIGITAL MICROSCOPE AND DATA-PROCESSING PROGRAM

CROSS-REFERENCE TO RELATED APPLICATIONS

This application claims priority from and the benefit of PCT Application PCT/EP2015/065945, which is hereby incorporated by reference in its entirety.

TECHNICAL FIELD

The invention relates to a method for correcting illumination-dependent aberrations in a modular digital microscope which comprises a motorized zoom device and a replaceable objective. Furthermore, the invention relates to a digital microscope and a data-processing program for carrying out the method.

BACKGROUND

In digital microscopy illumination-dependent, systematic aberrations occur which are shaped with different strengths in particular when using exchangeable objectives and motorized zoom systems from device to device and according to the actual zoom setting.

Such illumination-dependent, systematic aberrations can be, for example, reflexes in a coaxial reflected light illumination which are problematic and/or make the use of coaxial reflected light illumination impossible, in particular in the case of objectives with a comparatively large focal length.

Since the illumination types are frequently combined with each other in microscopy, these aberrations can absolutely also occur combined in different sizes.

Various methods are known for the image correction in optical systems, in particular from digital camera technology. For example, in the case of photo objectives vignetting is used as a correction means for image errors (Koma).

There are furthermore attempts for the digital correction of multiple reflexes in photo objectives. In order to correct artefacts in the taking of images, the method of dark image reproduction is customary.

An image recording system from the application area of "machine vision" is known from US 2002/0041383 A1. In this system all geometric distortions by camera, objective, illumination and computer should be measured and digitally corrected in order to calculate a distortion-free digital image in the correct enlargement. The images are corrected and are all scaled to the same enlargement. A simultaneous correction of different aberrations takes place. A system calibration takes place with a special geometric and/or illumination calibration mask, for which two cameras are required. The described method is extremely expensive.

When using a coaxial reflected light illumination with a microscope, light is coupled into the observation beam path by a beam divider. Before the light strikes the object it passes through at least one optically active element of the observation lens. Certain parts of the light are reflected on the boundary surface of such an element, in particular in the vicinity of the optical axis, and are mixed with the useful light propagated from the object by the observation lens. This reflected light forms the so-called top illumination reflex.

In modular zoom systems such top illumination reflexes can occur in certain objectives which change their shape, color and intensity during zooming and also during the change to another objective with the same construction.

DETAILED DESCRIPTION OF ILLUSTRATED EXAMPLES

The invention has the problem of making available a method for correcting illumination-dependent aberrations, in particular for correcting a top illumination reflex caused by coaxial reflected light illumination in a modularly constructed digital microscope with motorized zoom system and replacement objective, as well as a digital microscope and a data-processing program for carrying out the method.

The solution of the problem is achieved by a method with the features of Claim 1, by a digital microscope with the features of claim 9 and by a data-processing program with the features of Claim 10.

A digital microscope in which the method of the invention can be used comprises a preferably replaceable objective, a preferably motorized zoom system, a coaxial reflected light illumination device, a digital image detection unit, an image processing unit and a control unit. The correction method of the invention runs in the image processing unit in that it is preferably implemented in a controller (FPGA).

The method of the invention is based on the using of calibration data which is preferably stored in the image processing unit as a calibration data record.

The calibration data record is determined for each combination of the objective and zoom and stored in a data memory. Since the objectives comprise an electronic interface, the control unit can recognize the particular objective being used and select the fitting calibration data record. If the calibration data record is still not present for a certain configuration, the control unit performs a calibration procedure which takes place in the following manner:

The reflected light illumination is adjusted to a certain value of the possible current feed (preferably 40%). The digital control value for this is stored. The optical device is positioned in such a manner that no objects lie in the focus of the illustration (maximal defocusing). A maximal defocusing can also be achieved in that a mat calibration cap that is coated to be non-reflective to the extent possible is set on the objective. A protective objective cover could also be used for a correspondingly shaped inner surface as a calibration cap.

An image of the top illumination reflex is now produced on the sensor. It can possibly be necessary to suitably darken the space around the optical device.

Now, n specified zoom positions are successively approached, wherein the minimal and the maximal zoom must be included in any case as zoom positions. The system now determines preferably automatically the aperture and the integration time and an image of the particular top illumination reflex is recorded per zoom position and subsequently stored together with the integration time and the zoom position.

In an especially preferred embodiment of the method of the invention the image is scaled each time in a low resolution, as will be explained later using an exemplary embodiment. To this end it is preferably beforehand deep-pass filtered. Now, on the one hand the calibration former can advantageously be stored with a low memory requirement and as a result the live correction method can furthermore be carried out more rapidly.

The correction method of the invention can advantageously be used in the live image mode and comprises steps described in the following.

At first, a check is made whether a calibration data record is present in a memory of the control unit or of the image processing unit for the present combination of modules (zoom and objective). If not, the previously described calibration is carried out.

The current zoom position is determined for an image drawn in on the image detection unit.

Furthermore, the actual current feed value of the direct illumination and the actual integration time of the image detection unit are determined. A correction factor is calculated from this data which puts the calibration state and the actual state in a relationship.

A reflex image is calculated as a function of the zoom factor from the calibration images adjacent to the zoom position. This can take place, for example, with a convex linear combination.

The reflex image is now calculated with the correction factor to an adapted reflex image, preferably by multiplication.

The adapted reflection image is subsequently subtracted from the currently detected image, namely on the pixels, which are not overdriven.

The multiplication of the difference image subsequently takes place by a factor for reestablishing or approximating the original brightness.

For the instance that the calibration builders are present in reduced resolution, a bilinear interpellation supplies the reflex image to be used on all pixels in complete resolution for the weighted image print.

A few advantageous aspects and embodiments of the method of the invention are explained in detail in the following using an especially preferred embodiment.

The method of the invention is used in this embodiment in a digital microscope comprising an optical unit with an objective, a motorized zoom system, an image detection unit with an image sensor and an image processing unit. The optical unit comprises a coaxial bright field illumination device and is arranged in a stand that can be adjusted in height by a motor. The digital microscope furthermore comprises an object table that can shift in a horizontal plane and vertically and comprises a control unit. Furthermore, the digital microscope comprises a user interface to which a PC is preferably connected.

At first, a variant for producing a calibration data record will be explained.

A calibration routine is stored in the control unit and in which the steps for the calibration procedure are implemented. At first, a check is made whether the objective is new in the microscope. For this, a "ROS'" memory in which the serial numbers of the last ten objectives used are stored is checked for the presence of the current objective. The memory can be, for example, an SD card or another alternate memory or also a fixed system memory. If the objective is already known, a direct shift into the operating mode can be made since in this case calibration data records are already present.

A communication such as, e.g., "please wait—calibration reflex correction" is now sent from the control unit to the user interface and is preferably shown on a monitor.

The drive of the optical unit of the microscope is moved into the highest position and the object table is moved into the lowest position. The zoom is adjusted to a minimal value which can optionally vary between the objective types, e.g., $\beta=0.5$. Any dark-field illumination present is cut out, if present. The coaxial bright-field illumination device is cut in with a defined current feed (e.g., 40%).

Nine calibration builders in different zoom positions with constant illumination are now acquired. The zoom positions comprise in each case the smallest and the largest possible zoom factor, wherein the smallest zoom factor can depend on the objective type, and the zoom positions should have more supporting positions in the area of the completely visible reflex. This is usually the case in the smaller enlargement stages while in the case of a large zoom factor the reflex tends to appear as a "misty brightening". 0.5, 0.565, 0.8, 1, 1.4, 1.9, 3.5 are zoom positions in the described embodiment. The calibration images are stored with their particular shutter speed as metadata. The shutter speed is preferably automatically determined in the calibration mode. In order to also have the shutter speed available between the calibration shutter speeds, the course of the shutter speeds over the zoom positions is approximated by an exposure formula. This is preferably a polynomial of the fourth degree. In order that this exposure formula supplies exact values to the zoom positions, the quotient of the adapted in the actual shutter speed is determined in the calibration images are multiplied by the particular quotient. The paradigm that the shutter speed is proportional to the brightness, which is customarily also presupposed for HDR techniques, results in an exact interpellation formula for the shutter speeds of the calibration images.

In order to make possible an especially rapid live correction mode, the calibration images are processed in each of their color channels as follows:

Using of a deep pass filter, e.g., by using a sliding 2D average value with 40×40 pixels.

Scaling of the image in a 19×27 pixel image of the reflex for each color channel. Starting from the image center, each sixtieth pixel is used in every direction including the image center.

The nine scaled calibration images, the calibration illuminance L_CBF and five coefficients for the fit of the exposure times E_R over the nine enlargement stages are stored by a polynomial of the fourth order in the memory as calibration data record.

A notice "calibration ready" to the user interface subsequently takes place.

The option live reflex correction can be selected in the microscope operation. In the selection of this option the exposure time E_N, the current feed value of a Hellfeld illumination L_BF and a current zoom position are determined for each image acquired. These values can be determined directly on the microscope since the components have electronic interfaces to the control unit.

The constant calibration illuminance L_CBF is now read out of the calibration data record and the correct shutter speed E_R for the current zoom position is determined. In order to determine E_R the five coefficients of the calibration data record are read out and the polynomial for the current enlargement $\beta$ is calculated.

If the current enlargement $\beta$ is not an enlargement used in the calibration process, the two adjacent zoom stages are determined and the scaled reflex image is determined by in linear interpolation of the associated calibration images ima, imb. For the instance that the current enlargement $\beta$ precisely meets one of the calibration zoom stages, the particular calibration image is used as a reflex image to be scaled.

The calibration image is calculated back onto the original size, e.g., 1200×1600 pixels by bilinear interpolation: this does not have to take place for the entire image but rather can take place for each original image pixel "on the fly" since the bilinear interpolation takes place locally (in the image processing unit).

This circumstance complies with the processing in a FPGA (field-programmable gate array) with line-by-line processing of the live pixel stream.

The resolution-increased image is now scaled with the current and calibration data according to the following formula which represents the correction factor:

$$\frac{E\_N * L\_BF}{E\_R * L\_CBF} * 0,97$$

The value 0.97 is an exemplary safety factor here which can be adapted to the requirements but is not obligatorily required.

The reflex image modified in this manner is subtracted from the live image on non-overdriven pixels. Even this subtraction can take place pixel-by-pixel or line-by-line.

The dynamic circumference is subsequently stretched, for which different stretching methods can be used that are known to a person skilled in the art.

The previously described method is advantageously implemented in the hardware of the image processing unit for the live correction but is also suitable for being used in a separate software for the post-processing of images.

The effect of the correction method of the invention is shown in the following using the figures.

Figure 2:

In the figures:

FIG. 1: Shows a microscope image under coaxial bright-field illumination with reflex;

FIG. 2: Shows the microscope image according to FIG. 1 when using the correction method.

Figure 3:
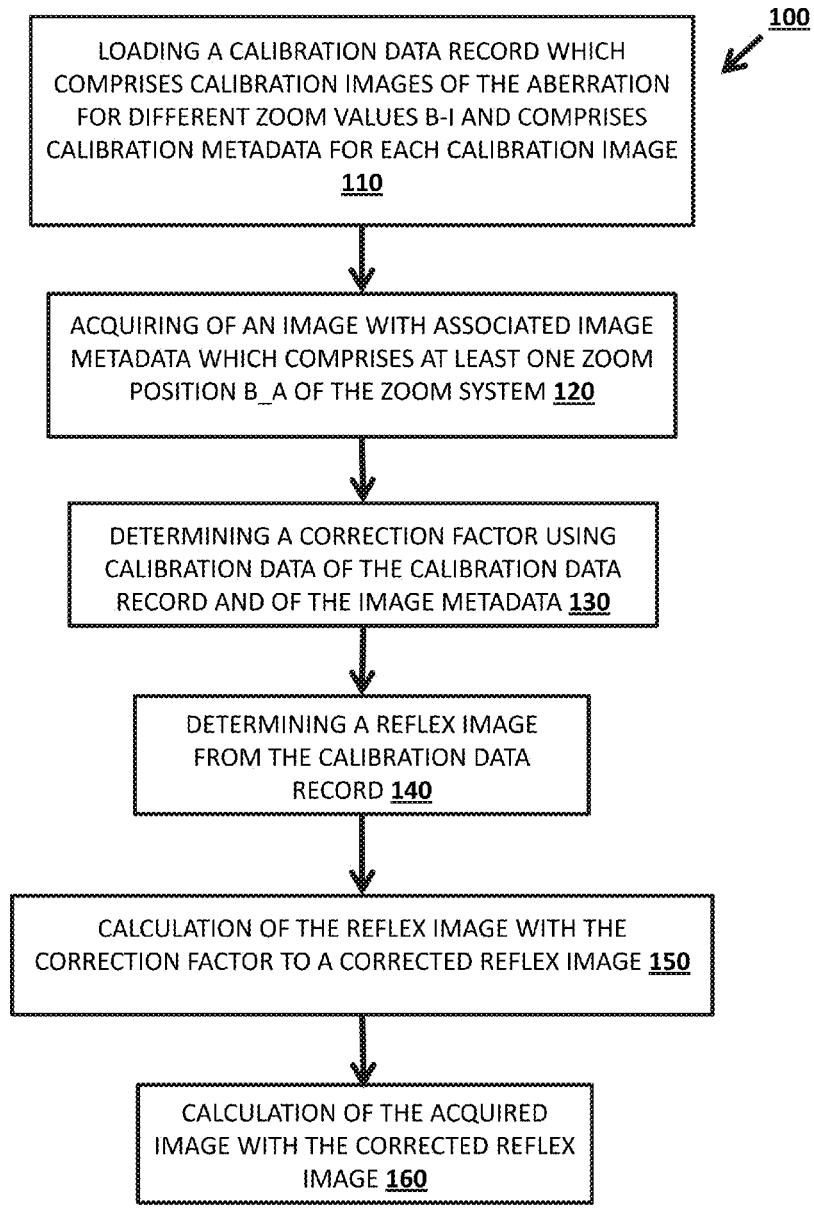

FIG. 3: Shows a flow chart for carrying out the disclosed method for the correction of illumination-dependent aberrations in a modular digital microscope.

The view of the microscope image in FIG. 1 clearly shows a reflex of the bright-field illumination which can no longer be seen in FIG. 2 when using the live reflex correction.

The invention claimed is:

1. A method for the correction of illumination-dependent aberrations in a modular digital microscope with a coaxial bright-field illumination device, a motorized zoom device, an objective, a digital image detection unit and an image processing unit, the method comprising:
   Loading a calibration data record to the image processing unit, the calibration data record comprises calibration images of the illumination-dependent aberration in the modular digital microscope with a motorized zoom device for different zoom values ($\beta\_i$), the calibration data record also comprises calibration metadata for each calibration image;
   Acquiring an image using the digital image detection unit, the image including associated image metadata which comprises at least one zoom position ($\beta\_a$) of the zoom system;
   Determining a correction factor using calibration data of the calibration data record and of the image metadata,
   Determining, using the image processing unit, a reflex image from the calibration data record;
   Calculating, using the image processing unit, a corrected reflex image based on the reflex image and the correction factor; and
   Calculating, using the image processing unit, the acquired image with the corrected reflex image to correct the illumination-dependent aberration.

2. The method of claim 1, wherein the image metadata furthermore include an intensity of illumination (L_BF) of the bright-field illumination device and an integration time (E_N) of the image detection unit.

3. The method of claim 2, wherein the correction factor is calculated according to the following formula:

$$\frac{E\_N * L\_BF}{E\_R * L\_CBF} * K,$$

wherein K is a safety factor, E_R is a modelled integration time and L_CBF is a current value of the intensity of illumination of the calibration adjustment of the microscope.

4. The method of claim 3, wherein the modelled integration time (E_R) is calculated by a formula which is determined by approximation from the image metadata and the calibration metadata.

5. The method of claim 1, wherein the reflex image is calculated from at least two calibration images by interpolation which have adjacent zoom positions ($\beta\_i$) as metadata for the actual zoom position($\beta\_\alpha$).

6. The method of claim 1, wherein the reflex image is multiplied by the correction factor.

7. The method according to claim 1, wherein the calibration data record is prepared by:
   a) Adjusting a predetermined value of the reflected light illumination device (L_CBF);
   b) Adjusting a maximum defocusing;
   c) Adjusting a certain zoom position ($\beta\_$);
   d) Acquiring an image as calibration image;
   e) Storing the calibration image with the associated zoom position ($\beta\_R$) and integration time (E_R) in the calibration data record,
   f) Repeating the steps b) to e) for different zoom positions ($\beta\_i$) including minimum and maximum zoom positions.

8. The method of claim 7, further comprising:
   a) Calculating a modelled integration times by approximating the integration times used to the zoom positions by a model, preferably a polynomial of the fourth degree;
   b) Determining quotients from modelled and used integration times;
   c) Multiplying the calibration images by the quotients determined.

9. A digital microscope, comprising an objective, a zoom system, a coaxial direct illumination device, a digital image detection unit, an image processing unit and a control unit, wherein the method according to claim 1 is implemented in the image processing unit.

10. A non-transitory machine-readable medium having stored thereon instructions for performing the method according to claim 1.

* * * * *